Patented Dec. 27, 1949

2,492,314

UNITED STATES PATENT OFFICE 2,492,314

PROCESS FOR PRODUCING METAL SALTS OF SUBSTITUTED DITHIOCARBAMIC ACIDS

John F. Olin and Thomas E. Deger, Grosse Ile, Mich., assignors to Sharples Chemicals Inc., a corporation of Delaware No Drawing. Application January 16, 1945, Serial No. 573,134

24 Claims. (Cl. 260—429)

1

This application is a continuation in part of our prior application Serial No. 516,246, filed December 30, 1943, which has been abandoned in favor of this application. The present invention relates to the preparation of salts of substituted dithiocarbamic acids. The invention includes within its scope the preparation of salts of mono- or di-alkyl, heterocyclic or cycloaliphatic dithiocarbamic acids.

The invention was conceived primarily as a direct and an economical process for obtaining these salts of the substituted dithiocarbamic acids from a novel process involving reaction of an amine, carbon disulfide and a water-insoluble metal oxide or hydroxide, such as zinc oxide or hydroxide. The reaction is preferably conducted in the absence of a mutual solvent for the reactants. The products formed by the invention are salts of dithiocarbamic acids which are N-substituted by one or two organic radicals as indicated above, although the invention is principally useful in preparation of salts containing two such radicals.

Heretofore, the conventional method for the preparation of the water-insoluble salts of these acids has involved the initial preparation of a water-soluble salt, e. g., sodium dialkyl dithiocarbamate, by reaction of the amine, carbon disulfide and sodium hydroxide in aqueous solution, and subsequent reaction of this salt with an aqueous solution of a water-soluble salt such as zinc chloride, containing the metal constituent of the ultimately desired salt.

The experimental work of the present applicants demonstates that their direct reaction method for the preparation of the insoluble metal salts of the substituted dithiocarbamic acids has the following distinct advantages—a shorter reaction time; economy in the expenditure of raw materials; reduced number of essential steps; improved utilization of the heat of reaction; and much larger yield of finished product per unit of reactor volume.

As noted above, in the practice of the prior art, an amine and carbon disulfide were first reacted with sodium hydroxide in aqueous solution as follows:

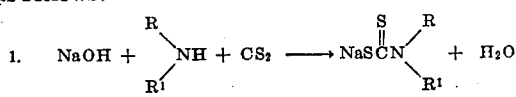

representing an organic radical, and R' representing an organic radical or hydrogen. Accordingly, the amines employed are primary or secondary amines. The sodium salt of the dithio-

2 carbamic acid was then reacted with a water-soluble salt to form the final product by metathesis, as indicated by the following equation representing practice of the process of the prior art in manufacture of a zinc salt:

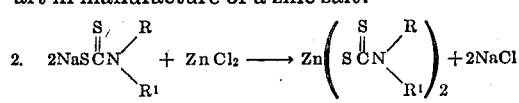

As contrasted to the above sequence of reactions, which entails a rather complicated and expensive method of manufacture, the present invention represents a very simple operation, as indicated by the following equation, which illustrates manufacture of a zinc salt of an alkyl dithiocarbamic acid, using zinc hydroxide as a starting material:

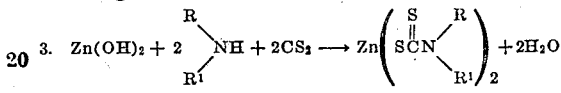

When an oxide, instead of a hydroxide, is used as the source of the metal constituent, the reaction is analogous to that indicated by Equation 3 above, as illustrated by the reaction of zinc oxide to form a zinc salt of a di-alkyl dithiocarbamic acid:

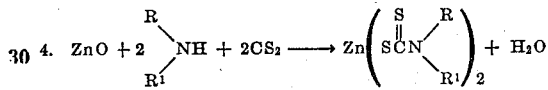

It will be noted that the only differences between Equations 3 and 4 consist in the substitution of zinc hydroxide for zinc oxide, and the fact that ony one molecule of water is formed in Equation 4 for each molecule of zinc oxide used, instead of formation of two molecules of water as in the case of use of zinc hydroxide.

The preferred method of practicing the invention is to place a water-insoluble metal oxide or hydroxide in a jacketed mixer, and then to add an approximately equivalent quantity of an amine as quickly as possible. After several minutes of very intensive mixing, an approximately equivalent quantity of carbon disulfide is poured into the mixer and intensively mixed with the amine and metal oxide or hydroxide. The temperature will begin to rise and may be controlled by circulating hot or cold water through the jacket for the purpose of maintaining a temperature optimum for promotion of the reaction to the right. The reaction temperature will range from 0° C. to 150° C., and the particular temperature used will depend somewhat upon the amine and metal oxide or hydroxide used in the reaction. The pressure to be maintained during the reaction will ordinarily vary between subatmospheric and 100 pounds per square inch, and the pressure has a tendency to drop during the course of the reaction.

As noted above, the reaction is best conducted with approximately stoichiometric equivalents of the reactants, but in view of the fact that carbon disulfide and some of the amines are volatile, it is sometimes desirable to use a slight excess of these compounds in order to compensate for vapor losses sustained. The reaction time varies with the temperature and particular dithiocarbamate being formed, but usually ranges from one-half hour to eight hours. After completion of the reaction, the water of reaction and any excess of carbon disulfide or amine are removed by vacuum distillation.

While a feature of the invention consists in the fact that the reaction between carbon disulfide, amine and metal oxide or hydroxide is accomplished without the use of a solvent for the metal oxide or hydroxide, small amounts of various liquids may be included in the reaction mixture, these liquids being ordinarily used in quantities much less than would be necessary to form a solution or suspension of the reactants or product. We thus contemplate use of various liquids which are inert under the conditions of the reaction, including organic liquids and water. Our experience has demonstrated that the presence of small amounts of certain liquids such as benzene, toluene or chloroform or other chlorinated aliphatic hydrocarbons assists in promotion of the reaction to the right. While the action of these liquids is not entirely understood, we believe that, in most cases, they assist in practice of the reaction by removing coatings of the desired metal salt resultant which tend to form on the surfaces of the larger particles of metal oxide being subjected to reaction. Practical experience with such liquids has demonstrated that by their use the amount of xylene or chloroform insoluble material in the resulting reaction mixture can be reduced from a range between 1 and 5% to a range between 0 and 1%. Objectionably large crystalline products are sometimes obtained in the practice of the process, and this can be prevented by the use of a very small amount of water. In most cases, the total amount of water or organic liquid contained in the reaction mixture should be less than 50% of the total weight of the reactants. Liquids used in the manner here discussed to assist in practice of the reaction may be termed "fluxing" liquids. The fundamental requirements of such liquids for use in practice of the process are that they should not enter into reaction with constituents of the reaction mixture, and that they should be easily removable after completion of the reaction or, in the alternative, harmless in the product. Such fluxing liquids may be used advantageously in amounts varying between 1% and 50% of the total weight of the reactants.

In place of the use of fluxing liquids, as described above, or in addition thereto, it has been found that a small quantity of wetting agent when added to the reactant mixture brings about more complete reaction than is normally obtained otherwise. Such wetting agents are usually added in amounts between 0.1% and 2.0% of the reaction mass and may include soaps, sodium salts of aromatic sulfonic acids, or any other wetting agent which is stable and inert to the reactants, and which may be easily removed from the product or is harmless thereto. In place of a soap itself, oleic acid or other long chain fatty acids may be added which then form soaps by reaction with some of the amine or oxide present.

Although the foregoing description teaches the preferred embodiment of the invention, numerous variants may be applied as to type of equipment, nature of the reactants, and reaction temperatures and pressures.

The invention is not limited to manufacture of the zinc salts of mono- and di-substituted dithiocarbamic acids, as discussed in detail above, but includes manufacture of salts of these acids by reaction of the corresponding water-insoluble metal oxides or hydroxides with amines and carbon disulfide regardless of the particular metal oxide or hydroxide. Thus, water insoluble oxides and hydroxides of copper, iron, mercury, silver, cadmium, tin, lead, antimony, bismuth, thallium, chromium, molybdenum, cobalt, nickel, calcium, magnesium and arsenic may be substituted for the zinc oxide or hydroxide in the process as described above. The invention may also be practiced in manufacture of dithiocarbamates in cases in which the operator does not, for some reason, desire to employ a sufficient amount of water in the reaction mixture to dissolve the metal oxide or hydroxide, even in cases in which the oxide or hydroxide is a water-soluble compound and would thus be dissolved if a sufficient quantity of water were used to effect that result. The primary feature of the invention consists in conduct of the reaction by intensively mixing the metal oxide or hydroxide in an undissolved condition with the carbon disulfide and amine, and not in the use of any particular metal oxide or hydroxide. Thus, hydroxides or oxides of any of the metals of groups 1, 2, 4, 5, 6 and 8 of the periodic table may be used in practice of the invention and the invention is especially useful in manufacture of copper, zinc, mercury, silver, cadmium, thallium, tin, lead, antimony, bismuth, chromium, molybdenum, iron, cobalt, nickel, selenium, lithium, sodium, potassium, rubidium, cesium, calcium, strontium, barium, magnesium and arsenic salts from the corresponding oxides and hydroxides.

While the invention is useful in manufacture of salts of mono- and di-substituted dithiocarbamic acids in which the substituent radicals are aliphatic or cycloaliphatic, and may in turn be substituted by other radicals, such as hydroxyl, amino, etc., regardless of the particular carbon content of the substituent radical or radicals, it will be especially useful in the manufacture of such compounds having open chain alkyl radicals of from 1 to 10 carbon atoms, and the corresponding cyclohexyl and cyclopentamethylene compounds.

While the greatest economic advantage in practice of the invention is attained in cases in which it is desired to prepare water-insoluble salts, there is substantial advantage in practice of the invention for manufacture even of the water-soluble salts such as the alkali metal salts, since practice of the reaction without the use of water as a solvent permits better utilization of the reactor equipment and also minimization of the number of purifying steps, expense of evaporation, crystallization, etc.

It is to be noted that the reaction yields the desired metallic derivative of a substituted dithiocarbamic acid directly, in the substantial absence of a solvent for the reacting compounds.

While a feature of the invention consists in reaction of a metal hydroxide or oxide with carbon disulfide and an amine in the absence of a solvent for the oxide or hydroxide, the metal radical may be obtained by decomposition of a salt, such as an oxy-salt of the desired metal, introduced into the reaction mixture, instead of being introduced as such.

The following examples provide illustrations of the practice of the invention in the manufacture of metal substituted dithiocarbamates:

Example I

Into a jacketed stainless steel Baker-Perkins kneading type mixer of 0.7 gallon working capacity were placed 244 grams zinc oxide of 99% purity and having a 0.12 micron particle size and 786 grams 99.5% dibutylamine. The mixing was started and 472 grams of carbon disulfide were added at a rate which kept the reaction mass below 75° C., with cooling water passing through the jacket. After all the carbon disulfide was added the mixture was heated to a temperature between 70 and 90° C. by passing hot water through the jacket, and kept at that temperature for one-half hour, after which the reaction was substantially complete. A vacuum of approximately 30–35 mm. was then applied and the heating continued for one more hour. The zinc dibutyl dithiocarbamate (zinc salt of dibutyl dithiocarbamic acid) was then discharged from the mixer after releasing the vacuum. It was obtained in 98.8% conversion in the form of a white, finely crystalline solid. It melted at 107–108° C. and contained only 0.17% xylene insoluble impurities.

Example II

Into a cylindrical, jacketed, stainless steel, Stokes rotary vacuum dryer of 3 cubic feet working capacity and equipped with close fitting ribbon-type mixing blades were introduced 7.25 pounds of zinc oxide analyzing 99.8% purity and 0.12 micron particle size and 23 pounds of dibutylamine. Mixing was started and the temperature regulated by passing hot water through the jacket so that the charge was maintained at about 50° C. The addition of 13.5 pounds of carbon disulfide was then started and the rate of addition controlled so that the temperature rose to 75° C. and remained approximately in that range without requiring further heat through the jacket of the mixer. Near the end of the carbon disulfide addition the temperature began to drop and hot water was again passed through the jacket. Stirring was continued at 85° C. for four hours after the carbon disulfide addition. Vacuum was then applied to the system and after four hours more at 75° C. the product was found to be substantially dry. After cooling to about room temperature the discharge valve on the bottom of the dryer was opened and the product dropped out. The zinc dibutyl dithiocarbamate thus produced was a white colored, finely crystalline solid melting at 107–108° C. and containing only 0.19% xylene insoluble impurities. It was obtained in a 99% conversion.

Example III

Into the same equipment as described in Example I were placed 460 grams of barium oxide and 780 grams of dibutylamine. The mixing was started and the addition of 460 grams of carbon disulfide made at a rate which kept the reaction mass below 50° C. with cooling water passing through the jacket. After all the carbon disulfide was added the mixture was kept at 60–70° C. by passing hot water through the jacket for four hours. The charge was then dried under vacuum at the same temperature for four hours more. The barium dibutyl dithiocarbamate was then discharged as a white, finely crystalline solid. The product contained only 0.2% xylene insoluble impurities. A 100% conversion was obtained.

Example IV

Into the same equipment as described in Example I were placed 948 grams of barium hydroxide containing 8 molecules of water of crystallization and 780 grams of dibutylamine. The mixing was started and the addition of 460 grams of carbon disulfide was made at a rate which kept the reaction mass below 50° C. with cooling water through the jacket. The remainder of the run was made under the same conditions as described in Example III except that the vacuum drying required six hours. The barium dibutyl dithiocarbamate was discharged as a white, finely crystalline solid and was obtained in 100% conversion. It contained 0.32% xylene insoluble impurities.

Example V

Into the same equipment as described in Example I are placed 669 grams of yellow lead oxide, 100% of which can be passed through a 200 mesh screen, and 780 grams of dibutylamine. The mixing is started and the addition of 460 grams of carbon disulfide is made at a rate which keeps the reaction mass above 70° C. by passing hot water through the jacket. The remainder of the run is made under the same conditions as described in Example III. The lead dibutyl dithiocarbamate is discharged as a light colored, finely crystalline solid.

Example VI

Into the same equipment as described in Example II were added 9.5 pounds of zinc oxide of 99.8% purity and having a 0.12 micron particle size and 17.0 pounds of diethyl amine of 99.0% purity. Mixing was started and 17.75 pounds of carbon disulfide were slowly added so that the temperature rose to 90–100° C. and remained there with cooling water passing through the jacket. After the carbon disulfide addition was completed the temperature was maintained at 100° C. for three hours with stirring. Vacuum of 28.5 inches mercury was then slowly applied while continuing the heating and stirring. After four hours the product was completely dry. The zinc diethyl dithiocarbamate thus produced was obtained in 99% conversion. It melted at 178–179° C. and contained 1.2% xylene insoluble impurities.

Example VII

Into the same equipment as described in Example I are placed 199 grams of finely powdered arsenious oxide and 780 grams of dibutylamine. The mixing is started and the addition of 460 grams of carbon disulfide made at a rate which keep the reaction mass at 60° C. with cooling water through the jacket of the mixer. The reaction mass is kept at that temperature for three hours before vacuum is applied. The drying operation requires three hours more. The product is a white solid melting at 125° C. and has 0.56% xylene insoluble impurities.

Example VIII

Into the same equipment as described in Example I were placed 169 grams of selenium dioxide powder and 460 grams of carbon disulfide. The mixing was started and the addition of 445 grams of diethylamine was made slowly, keeping the temperature between 25 and 35° C. with cooling water in the jacket until the addition was practically completed. The mixture was then heated to 50° C. and after two hours vacuum was applied. Drying required 2.5 hours. The selenium derivative which was a mixture of 53.5% divalent selenium diethyl dithiocarbamate and 46.2% tetraethyl thiuram disulfide was obtained in a 100% weight recovery. The product melted at 62° C.

Example IX

Into the same equipment as described in Example I are placed 468 grams of finely powdered bismuth oxide and 780 grams of dibutylamine. The mixing is started and the addition of 460 grams of carbon disulfide made in the same manner as described in Example VII. After reaction and vacuum drying there is obtained bismuth dibutyl dithiocarbamate.

Example X

The same method and equipment are used as in Example I, using 239 grams of powdered cupric oxide and 620 grams of dipropyl amine. 460 grams of carbon disulfide are slowly added at 50–60° C. The mixing is continued four hours at 70° C. after the carbon disulfide addition and the mixture is then dried under the same conditions for three hours. Copper dipropyl dithiocarbamate is obtained.

Example XI

The same method and equipment are used as in Example I. 222 grams of calcium hydroxide and 610 grams of dipropyl amine are placed in the mixer. After starting the mixer 460 grams of carbon disulfide are slowly added; keeping the temperature at 40–50° C. The mixing is continued four hours at 50° C. after the addition of carbon disulfide. The mixture is then dried for the same time and at the same temperature under vacuum. Calcium dipropyl dithiocarbamate is obtained as a white, finely crystalline solid.

Example XII

Into the same equipment as described in Example II were placed 16 pounds of finely powdered zinc oxide and 30 pounds of carbon disulfide. The mixer was started and cooling water passed through the jacket of the reactor. 18 pounds of dimethylamine were then slowly added at 40° C. under 55 pounds per square inch pressure. The reaction was complete in one hour under these conditions and after treatment under vacuum at 110° C. and 29 inches mercury the dried zinc dimethyl dithiocarbamate was obtained in 98% conversion as a white powder melting at 250° C. and containing 2.1% xylene insoluble impurities.

Example XIII

Into the same equipment as described in Example I are placed 243 grams of powdered zinc oxide and 535 grams 95% pure piperidine. 460 grams of carbon disulfide are then added at 80° C. and the mixing continued at 125° C. for three hours. The product is dried at 110° C. and 30 mm. for two hours. Zinc cyclopentamethylene dithiocarbamate is thus obtained.

Example XIV

Into the same equipment as described in Example I are placed 165 grams powdered sodium hydroxide and 355 grams of mono-amyl amine Mixing is started and the mass cooled to 5° C. 310 grams of carbon disulfide are added slowly at 5–10° C. requiring two hours for the addition. The mixture is stirred for one hour more at 10° C. A vacuum of 20 mm. is then applied and the product dried with stirring at 25° C. for five hours. The sodium salt of mono-amyl dithiocarbamic acid thus obtained is a white, greasy solid.

Example XV

Into the same equipment as described in Example I were placed 244 grams of powdered zinc oxide, 786 grams dibutylamine and 31 grams of benzene. 472 grams of carbon disulfide were then added slowly during 11 minutes while maintaining a temperature between 32 and 60° C. and a pressure between 0 and 13 inches of mercury pressure (gauge). The mixing was continued for 1¼ hours at 60 to 65° C. Vacuum was then applied for 1½ hours at 70–75° C. The yield of zinc dibutyl dithiocarbamate was 98%. The melting point of the product was 106–109° C. and it contained less than 0.01% of xylene insoluble impurities.

Example XVI

Into the same equipment as described in Example I there were placed 443 grams of diethylamine, 244 grams of powdered zinc oxide and 162 grams of benzene. 466 grams of carbon disulfide were then added over a period of 15 minutes at 26–77° C. and at an average gauge pressure of 13 inches of mercury. Mixing was continued for one hour at 70° C. Vacuum was then applied for ½ hour at 70° C. Zinc diethyl dithiocarbamate was obtained in 99% yield. The melting point of the product was 177.2 to 178.3° C. It contained 0.065% of xylene insoluble impurities.

Example XVII

Into the same equipment as described in Example I there were placed 222.4 grams of selenium dioxide, 250 grams water and 612 grams of carbon disulfide. 594 grams of diethylamine were then added over a period of 36 minutes at a temperature from 31 to 70° C. and at atmospheric pressure. The mixture was dried at 45° C. under vacuum for four hours. A yellow, powdery product was obtained containing no trace of unreacted dithiocarbamate or selenium dioxide. The yield was 98.6% and 99.2% of the product passed through a three mesh sieve. The melting point was 61.5–63° C.

Example XVIII

Into the same equipment as described in Example I, there were placed 326 grams of powdered zinc oxide, 608 grams of carbon disulfide and 305 grams of chloroform. 360 grams of anhydrous dimethylamine were then added over 49 minutes at 27–123° C. at 0–10 pounds per square inch gauge pressure. Mixing was continued for one hour and followed by drying under vacuum at 70° C. for one more hour. A 98.5% yield of zinc dimethyl dithiocarbamate was obtained, 99.29% of which passed through a 100 mesh sieve by the wet test insoluble impurities.

Example XIX

Into a 200 gallon working-capacity, kneading-type mixer were placed 249 pounds of finely divided zinc oxide and 1.75 pounds of commercial grade oleic acid. 278 pounds of 100% dimethylamine were then added as quickly as possible. 469 pounds of carbon disulfide were added over a period of 45 minutes at a reaction temperature of 55° C. The reaction was complete within one hour. Vacuum was then applied to the mixer and steam passed through the mixer jacket and hollow mixing arms. The drying step was carried out at 115° C. and a vacuum of 27 inches of mercury. Drying was complete in 9 hours. 933 pounds of zinc dimethyldithiocarbamate were discharged from the mixer for a 98% yield. The product was a white powder melting at 246° C. and having only 0.09% chloroform insolubles.

Example XX

Into a 0.7 gallon working-capacity kneading-type mixer were placed 162 grams of finely powdered zinc oxide, 50 grams of water, 2 grams of sodium diamylnaphthalene sulfonate and 516 grams of dibutylamine. 304 grams of carbon disulfide were added over a period of 15 minutes. Mixing was continued for one hour. The mass was then vacuum dried at a maximum temperature of 50° C. at 5 mm. pressure. 939 grams of zinc dibutyldithiocarbamate were obtained for a 99% yield.

Example XXI

Into a 0.7 gallon working-capacity kneading-type mixer were placed 240 grams ethylene diamine and 318 grams finely divided copper oxide. 608 grams carbon disulfide were slowly added over a period of one hour. Mixing was continued for another half hour. A brown resinous product was obtained after vacuum drying.

As indicated by the above examples, a number of modifications of the invention are possible within the scope of the invention, which is not subject to any limitation except as defined in the appended claims.

We claim:

1. The process of forming metal salts of substituted dithiocarbamic acids which comprises contacting for purposes of reaction a compound chosen from the class consisting of metal oxides and hydroxides while preponderantly in an undissolved condition with carbon disulfide and a compound chosen from the class consisting of primary and secondary aliphatic, heterocyclic, and cycloaliphatic amines and intensively mixing said contacted materials to effect reaction therebetween.

2. The process of forming metal salts of substituted dithiocarbamic acids which comprises contacting for purposes of reaction a water-insoluble compound chosen from the class consisting of metal oxides and hydroxides while preponderantly in an undissolved condition with carbon disulfide and a compound chosen from the class consisting of primary and secondary aliphatic, heterocyclic, and cycloaliphatic, amines and intensively mixing said contacted materials to effect reaction therebetween.

3. The process of forming metal salts of substituted dithiocarbamic acids which comprises contacting for purposes of reaction a metal oxide while preponderantly in an undissolved condition with carbon disulfide and a compound chosen from the class consisting of primary and secondary aliphatic, heterocyclic, and cycloaliphatic, amines and intensively mixing said contacted materials to effect reaction therebetween.

4. The process of forming metal salts of substituted dithiocarbamic acids which comprises contacting for purposes of reaction a metal hydroxide while preponderantly in an undissolved condition with carbon disulfide and a compound chosen from the class consisting of primary and secondary aliphatic, heterocyclic, and cycloaliphatic, amines and intensively mixing said contacted materials to effect reaction therebetween.

5. The process of forming metal salts of substituted dithiocarbamic acids which comprises contacting for purposes of reaction a water-insoluble metal oxide while preponderantly in an undissolved condition with carbon disulfide and a compound chosen from the class consisting of primary and secondary aliphatic, heterocyclic, and cycloaliphatic, amines and intensively mixing said contacted materials to effect reaction therebetween.

6. The process of forming metal salts of substituted dithiocarbamic acids which comprises contacting for purposes of reaction a water-insoluble metal hydroxide while preponderantly in an undissolved condition with carbon disulfide and a compound chosen from the class consisting of primary and secondary aliphatic, heterocyclic, and cycloaliphatic, amines and intensively mixing said contacted materials to effect reaction therebetween.

7. The process of forming metal salts of substitute dithiocarbamic acids which comprises contacting for purposes of reaction a compound chosen from the class consisting of metal oxides and hydroxides while preponderantly in an undissolved condition with carbon disulfide and a dialkyl amine and intensively mixing said contacted materials to effect reaction therebetween.

8. The process of forming metal salts of substituted dithiocarbamic acids which comprises contacting for purposes of reaction a water-insoluble compound chosen from the class consisting of metal oxides and hydroxides while preponderantly in an undissolved condition with carbon disulfide and a dialkyl amine and intensively mixing said contacted materials to effect reaction therebetween.

9. The process of forming copper salts of substituted dithiocarbamic acids which comprises contacting cupric oxide while preponderantly in an undissolved condition with carbon disulfide and a compound chosen from the class consisting of primary and secondary aliphatic, heterocyclic, and cycloaliphatic, amines and intensively mixing said contacted materials to effect reaction therebetween.

10. The process of forming copper salts of alkyl dithiocarbamic acids which comprises contacting cupric oxide while preponderantly in an undissolved condition with carbon disulfide and a dialkyl amine and intensively mixing said contacted materials to effect reaction therebetween.

11. The process of forming zinc salts of dimethyl dithiocarbamic acid which comprises contacting zinc hydroxide while preponderantly in an undissolved condition with carbon disulfide and dimethyl amine and intensively mixing said contacted materials to effect reaction therebetween.

12. The process of forming metal salts of substituted dithiocarbamic acids which comprises contacting for purposes of reaction a compound chosen from the class consisting of metal oxides and hydroxides while preponderantly in an undissolved condition with carbon disulfide and a dialkyl amine having from 1 to 10 carbon atoms in the respective alkyl radicals and intensively mixing said contacted materials to effect reaction therebetween.

13. The process of forming metal salts of substituted dithiocarbamic acids which comprises contacting for purposes of reaction a water-insoluble compound chosen from the class consisting of metal oxides and hydroxides while preponderantly in an undissolved condition with carbon disulfide and a dialkyl amine having from 1 to 10 carbon atoms in the respective alkyl radicals and intensively mixing said contacted materials to effect reaction therebetween.

14. The process of forming metal salts of substituted dithiocarbamic acids which comprises contacting for purposes of reaction reactants including a compound chosen from the class consisting of metal oxides and hydroxides while preponderantly in an undissolved condition, carbon disulfide and a compound chosen from the class consisting of primary and secondary aliphatic, heterocyclic, and cycloaliphatic, amines and intensively mixing said reactants in the presence of a liquid inert to said reactants to effect reaction to form the desired metal salt.

15. In the manufacture of the selenium salt of diethyl dithiocarbamic acid, the process comprising contacting selenium dioxide while preponderantly in an undissolved condition with diethyl amine and carbon disulfide and intensively mixing said contacted materials to effect reaction therebetween.

16. In the manufacture of the selenium salt of a dialkyl dithiocarbamic acid having from 1 to 10 carbon atoms in each alkyl radical, the process comprising contacting selenium dioxide while preponderantly in an undissolved condition with a dialkyl amine having from 1 to 10 carbon atoms in each alkyl radical and carbon disulfide and intensively mixing said contacted materials to effect reaction therebetween.

17. The process of forming metal salts of dialkyl dithiocarbamic acids which comprises contacting for purposes of reaction a compound chosen from the class consisting of metal oxides and hydroxides while preponderantly in an undissolved condition with carbon disulfide and an aliphatic amine and intensively mixing said contacted materials to effect reaction therebetween in the absence of a mutual solvent for said metal oxide, amine and carbon disulfide but in the presence of a small quantity of water.

18. The process of forming metal salts of substituted dithiocarbamic acids which comprises contacting for purposes of reaction a compound chosen from the class consisting of metal oxides and hydroxides while preponderantly in an undissolved condition with carbon disulfide and a compound chosen from the class consisting of primary and secondary aliphatic, heterocyclic, and cycloaliphatic, amines and intensively mixing said contacted materials in the presence of a wetting agent to effect reaction therebetween to form the desired metal salt.

19. The process of forming metal salts of dialkyl dithiocarbamic acids containing from 1 to 10 carbon atoms in the respective alkyl radicals which comprises contacting for purposes of reaction a water insoluble compound chosen from the class consisting of metal oxides and hydroxides while preponderantly in an undissolved condition with carbon disulfide and a dialkyl amine containing between 1 and 10 carbon atoms in the respective alkyl radicals, and intensively mixing said contacted materials in the presence of a wetting agent to effect reaction therebetween to form the desired metal salts.

20. The process of forming zinc salts of substituted dithiocarbamic acids in which the substituents are selected from the class consisting of aliphatic, heterocyclic, and cyclo-aliphatic, radicals, which comprises contacting zinc oxide while preponderantly in an undissolved condition with carbon disulfide and a compound chosen from the class consisting of primary and secondary aliphatic, heterocyclic, and cycloaliphatic, amines and intensively mixing said contacted materials to effect reaction therebetween.

21. The process of forming zinc salts of alkyl dithiocarbamic acids which comprises contacting zinc oxide while preponderantly in an undissolved condition with carbon disulfide and a dialkyl amine and intensively mixing said contacted materials to effect reaction therebetween.

22. The process of forming zinc salts of dialkyl dithiocarbamic acid which comprises contacting zinc oxide while preponderantly in an undissolved condition with carbon disulfide and a dialkyl amine having from 1 to 10 carbon atoms in each alkyl radical, and intensively mixing said contacted materials to effect reaction therebetween.

23. In the manufacture of the zinc salt of dibutyl dithiocarbamic acid, the process comprising contacting zinc oxide while preponderantly in an undissolved condition with dibutyl amine and carbon disulfide and intensively mixing said contacted materials to effect reaction therebetween.

24. The process of forming a metal salt of a substituted dithiocarbamic acid which comprises intensely agitating a reaction mixture comprising carbon disulfide, a compound in undissolved form chosen from the class consisting of water-insoluble metal oxides and hydroxides, and a compound chosen from the class consisting of primary and secondary aliphatic, heterocyclic, and cycloaliphatic amines.

JOHN F. OLIN.
THOMAS E. DEGER.

REFERENCES CITED

The following references are of record in the file of this patent:

UNITED STATES PATENTS

| Number | Name | Date |
| --- | --- | --- |
| 1,440,962 | Cadwell | Jan. 2, 1923 |
| 1,863,572 | Lommell | June 21, 1932 |
| 1,983,240 | Olin | Dec. 4, 1934 |
| 2,046,875 | Jones | July 7, 1936 |
| 2,046,876 | Jones | July 7, 1936 |
| 2,046,884 | Semon | July 7, 1936 |
| 2,109,952 | Wyler | Mar. 1, 1938 |
| 2,189,383 | Ralston | Feb. 6, 1940 |
| 2,258,847 | Cramer | Oct. 14, 1941 |
| 2,263,262 | Cupery | Nov. 18, 1941 |
| 2,289,595 | Scott | July 14, 1942 |
| 2,331,650 | Blake | Oct. 12, 1943 |
| 2,342,332 | Dean | Feb. 22, 1944 |

FOREIGN PATENTS

| Number | Country | Date |
| --- | --- | --- |
| 448,632 | Germany | Aug. 24, 1927 |